Patented Aug. 16, 1949

2,478,943

UNITED STATES PATENT OFFICE 2,478,943

COPOLYMER PHENOLIC ADHESIVE CONTAINING THE INTERCONDENSATION PRODUCT OF A MONOHYDRIC PHENOL AND A POLYHYDRIC PHENOL, METHOD OF PRODUCING SAME, AND UTILIZATION THEREOF

Philip H. Rhodes, Kingston, N. Y., assignor, by mesne assignments, to Koppers Company, Inc., a corporation of Delaware No Drawing. Application August 17, 1946, Serial No. 691,402

21 Claims. (Cl. 260—54)

The present invention relates to the preparation and utilization of a resin adhesive which is capable of setting at room temperature, that is, temperatures varying between about 60° F. and 120° F. and, more particularly, within a temperature range varying between 75° F. and 100° F., said resin adhesive being prepared from a permanently fusible copolymer monohydric phenol-aldehyde, dihydric phenol-aldehyde resin. The monohydric phenols which may be used are any which have been previously used for the preparation of heat-reactive phenol-aldehyde resins, as for example phenol per se, ortho, meta, or para cresols, xylenols, and commercial cresylic acids. The dihydric phenols which may be used for the preparation of the resin adhesives may be illustrated by resorcinol, catechol, hydroquinone, and orcinol.

The primary object of the present invention is to provide a cold setting copolymer resin adhesive in which the percentage of the polyhydric phenol in the total phenolic body is at least 20%.

Another object is to provide a resin adhesive of the character herein set forth in which the pH of the resin adhesive is maintained between 7 and 10.

A further object of the invention is to provide a resin adhesive in which the percentage of the polyhydric phenol or the dihydric phenol in the total phenolic body varies from 20% to 60%, said resin adhesive containing an inhibitor of gellation, as for example an aliphatic ketone including up to and including ten carbon atoms. The percentages set forth are taken on the weight of the total phenolic body.

Another object is to provide a resin adhesive, the break down of which on immersion in water is inhibited or substantially prevented.

Another object of the present invention is to provide a resin adhesive which will attain its final set at a temperature varying between 40° and 120° F. within a time period of 10 to 48 hours.

Another object of the present invention is to provide a copolymer resin adhesive solution of the type herein set forth, the speed of setting of which is accelerated by keeping the pH of the resin adhesive solution at 7 or above, but not greater than 10 or 10.5, although for some purposes the pH of the resin adhesive solution may vary between 7 and 9, that is should not exceed 9.

The present invention will be specifically illustrated by the following example:

EXAMPLE I

PRODUCING A RESIN CONTAINING 10% OF PHENOL AND 90% RESORCIN BASED ON THE MOLAR PROPORTIONS OF SAID PHENOLS IN THE PHENOLIC BODY OF THE RESIN

The following ingredients are mixed in the following proportions:

| | Grams |
|---|---|
| Phenol (U. S. P. crystals) | 280 |
| 37% formaldehyde | 165 |
| Sodium hydroxide | 6 |
| Water | 20 |

The phenol is melted in a reaction kettle and then formaldehyde is introduced therein followed by the addition of the sodium hydroxide which has been previously dissolved in water. Under agitation the mixture is gradually heated to reflux and maintained there until the formaldehyde is substantially completely reacted with the phenol to form a primary undehydrated phenol-aldehyde condensation product.

Separately 2970 grams of resorcin are dissolved in 1485 grams of 37% formaldehyde solution in a second reaction kettle. Heat is applied gradually to prevent any sudden exothermic reaction. After solution occurs, heating is continued until an exothermic reaction is initiated, which usually occurs at a temperature between 65° C. to 75° C. Obviously, the temperature at which the exothermic reaction will occur will depend to some extent on the character of the reacting constituents and other physical conditions thereof. At the conclusion of the exothermic reaction, the resulting hot liquid resin solution is added gradually to the phenol-formaldehyde undehydrated primary condensation product. During the addition, the contents of the reaction kettle are maintained at reflux. The latter varies usually from about 95° C. to 102° C. After the resorcin-formaldehyde primary condensation product has been added to the phenol-aldehyde condensation product present in the first reaction kettle, the contents thereof are maintained under reflux conditions for a period of time sufficient to assure the inter-condensation of the primary phenol-formaldehyde condensation product with the primary resorcin-formaldehyde condensation product. When using the above set forth quantities of reactants, usually about 15 to 30 minutes additional refluxing is desirable. This time limit is merely illustrative and is not by way of limitation. The final refluxing period should be sufficient, as stated, to effect inter-condensation of the primary condensation products and produce a substantially homogeneous liquid resin. The completion of the inter-condensation step is usually evidenced by the substantially complete absence of any free formaldehyde.

Thereafter, the inter-condensation product is subjected to distillation for the purpose of removing the water present in the condensation products and to effect further condensation and polymerization of the initial inter-condensation product. The distillation is preferably, although not necessarily, effected at atmospheric pressure until a substantial proportion, as for example, 80% to 90% of the water present in the inter-condensation product is removed. Preferably, a major portion of the water is removed by the time the temperature of the reaction mass reaches about 130° C. to about 135° C. The temperature of the reaction mass continually increases from reflux temperature to about the range set forth as water is removed. Thereafter, removal of the major portion of the water is effected under vacuum distillation, said distillation also functioning to remove any unreacted material, or materials, including phenol. By the time that the water has been substantially completely removed from the copolymer reaction product, the temperature of the molten mass has reached 155° C. to about 165° C. at a vacuum of 26 to 28 inches, the vacuum building up from zero as the distillation progresses.

Thereafter, the molten liquid material is removed from the reaction kettle and permitted to cool to thereby form a clear, brittle, permanently fusible copolymer phenol-resorcin-formaldehyde resin. As well known in the art, for the production of a permanently fusible phenol-aldehyde resin it is necessary that the molar ratio of the phenol to the aldehyde be less than 1 mol of the aldehyde for each mol of the phenolic body, the latter including, in the example given, both the phenol and resorcin.

The resin produced in accordance with the above example evidenced a softening point of 109.5° C. when tested on a variably heated copper bar. The resin showed no detectable free phenol, and contained less than .5 to 1% of moisture when tested in accordance with the standard A. S. T. M. method.

In the above example, the molar ratio of the formaldehyde to the phenol is less than 1:1, and the molar ratio of the formaldehyde to the resorcin is less than 1:1. In the example given, the molar ratio of the formaldehyde to the phenol is approximately 2:3, or, stated differently, .67:1, whereby a permanently fusible resin is produced.

In Example I the ratio of the formaldehyde to the resorcin is also less than 1:1, it being .67:1. These ratios are merely exemplary, it being within the scope of the present invention to prepare the monohydric phenol-aldehyde condensation product, in which the ratio of the aldehyde to the phenol may vary from as low as .5:1 to as high as 1.5:1. The ratio of the resorcin to the formaldehyde in the separately prepared permanently fusible condensation product may vary from somewhat below .5 to 1 to about .9 to 1. The above is subject to the limitation that when the two primary liquid reaction products are mixed with each other and prior to dehydration, the molar ratio of the aldehyde in the mixture to the total phenolic reactants in the mixture, including phenol and resorcin, is less than 1 of the formaldehyde or other aldehyde to 1 of the phenolic constituents, including both phenol and resorcin. Stated more broadly, in the final mixture prior to dehydration, the ratio of the aldehyde, as for example formaldehyde, to the total monohydric and dihydric phenolic bodies present in the mixture must be less than 1 of the aldehyde to 1 of the total phenolic body so as to produce as a final product a permanently fusible copolymer monohydric phenol-dihydric phenol-aldehyde resin.

To 1000 grams of the resin produced as above set forth there is added 400 grams of isopropyl alcohol, 600 grams water, and about 35 cc. of 12 normal sodium hydroxide solution which bring the pH of the mixture to approximately 7.5. This mixture is designated the "resin adhesive base," and as this term is herein used it includes a permanently fusible copolymer monohydric phenol-aldehyde polyhydric phenol-aldehyde resin and such fillers and solvents as are necessary or desirable to impart desirable properties to the final copolymer resin adhesive.

In order to set the above resin adhesive base at room temperature as herein defined, there is added thereto 125 grams of paraformaldehyde, this being the amount of paraformaldehyde sufficient to raise the ratio of the total formaldehyde to the total phenolic body including the resorcinol component and the phenol component to above 1:1.

In order to make the adhesive more effective as an adhesive for the bonding of cellulosic material such as wood, there is added with the paraformaldehyde 200 grams of walnut shell flour. The so prepared resin adhesive has a working life of 1 to 2 hours at 75° F. and when used as a wood adhesive for the manufacture of $\tfrac{3}{16}$" plywood will develop a strength of 500 lbs. per square inch with a corresponding wood failure of 50% within six hours at 75° F. to 80° F.

By "working life" is meant the time after the mixing during which the adhesive can be spread, that is, before the adhesive gels to an unusable state. The term "adhesive base" as herein used includes the copolymer condensation product of resins herein set forth together with the solvents and/or fillers.

Instead of employing the brittle resin produced in Example I the dehydration may be stopped when the temperature has reached approximately 135° C. at which time the water removed from the reaction is weighed. The theoretical amount of water present in the initial reaction formed chemically during the reaction is 1426 grams. The water removed during dehydration to 135° C. is approximately 1283 grams. Consequently there is approximately 143 grams of residual water still in the reaction product. Inasmuch as the resin produced in Example I weighs 3500 grams, it would be necessary to add to this quantity of resin 1591 grams of isopropyl alcohol, 1273 grams of water and 100.5 cc. of 12 normal caustic solution. However, because of the incomplete dehydration, there is still present in the kettle 143 grams of water. There is prepared a mixture of 1591 grams of isopropyl alcohol, 1130 grams of water and 100.5 cc. of 12 normal sodium hydroxide. This solution is added gradually to the contents of the kettle which is maintained under reflux to prevent the loss of solvents. Throughout the addition of the solvent mixture the temperature gradually falls and the resin solution so produced is then cooled to 40° C. to 50° C. before removal from the kettle. The resulting product is an adhesive base identical with that produced by the solution of 3500 grams of the brittle resin and may be utilized as above specified for the production of a bond between wooden pieces or between metal pieces or as a bond between two pieces one of which is a cellulosic piece. The adhesive has a "working life" of three hours and sets within six hours at 75° F. to 80° F.

EXAMPLE II

PRODUCTION OF A RESIN, THE PHENOLIC BODY OF WHICH CONTAINS 50% MONOHYDRIC PHENOL AND 50% DIHYDRIC PHENOL TAKEN ON A MOLAR BASIS

An undehydrated reaction product of phenol and formaldehyde is produced by reacting the following ingredients:

| | Grams |
|---|---|
| 90% aqueous phenol solution | 1560 |
| 37% formaldehyde | 825 |
| Sodium hydroxide | 28 |
| Water | 100 |

The phenol and formaldehyde in the proportions above set forth are first introduced into the reaction kettle and are followed by the addition of the sodium hydroxide dissolved in water. Under agitation the mass is gradually heated to reflux and maintained until the formaldehyde is substantially completely reacted with the phenol to form a primary undehydrated phenol-aldehyde condensation product.

There is then introduced into a separate reaction kettle 1660 grams of resorcin. Thereafter, there is added to the resorcin 500 grams of 37% formaldehyde. Heating is gradually applied with agitation until an exothermic reaction occurs. Thereafter the temperature of the resulting reaction mixture is raised to reflux temperature, and 330 grams of 37% formaldehyde is gradually added while maintaining a reflux temperature. There is thereby produced a primary undehydrated resorcin-formaldehyde condensation product. This product is preferably maintained in the kettle at a temperature which adapts it to be pumped, as for example, the temperature varying between 90° C. and 100° C.

The resorcin-formaldehyde condensation product is then gradually added to the phenol-formaldehyde condensation product present in the first reaction kettle, the addition being preferably effected while the phenol-formaldehyde condensation product is maintained at a reflux temperature. The inter-condensation of these two components, and subsequent dehydration is effected in a manner similar to that set forth in Example I.

The product produced is a brittle, permanently fusible copolymer phenol resorcin-formaldehyde resin having a softening point on the copper bar of 107.5° C. The resin shows no detectable free phenol and has less than .5% to 1% of moisture.

To 1000 grams of the brittle resin prepared as above set forth there is added 450 grams of water, 530 grams of isopropyl alcohol and 20 grams of acetone, and 9.6 cc. of 12 normal caustic to produce an adhesive base containing 50% solids. This forms an adhesive base which is now ready to be set by the addition thereto of a setting agent which is in the best form of the invention a formaldehyde-liberating setting agent.

To the resin adhesive base prepared as above set forth there is added 125 grams of paraformaldehyde, 200 grams of walnut shell flour. The resulting resin adhesive will have a "working life" of three hours at 75° F. and can be used to glue various objects together including wood to wood and metal to metal or any two cellulosic materials together. When used to manufacture a piece of 1/16" birch plywood the adhesive develops a bond strength of 500 p. s. i. and 50% wood failure within six hours at 75° F. to 80° F.

Referring to Example I the solvent mixture of the adhesive base therein set forth comprises water and commercial isopropyl alcohol and the pH of the adhesive base has been adjusted by the addition of a solution of 12 normal sodium hydroxide, the function of the latter being to make the resin adhesive base capable of cold setting by adjusting to within the pH range of 7 to 10.

In Example II in addition to the isopropyl alcohol, water and sodium hydroxide, there is present a small proportion of acetone. The acetone serves the dual purpose of improving the solvency of the solution for the resin the phenolic body of which is half phenol and half resorcinol, but in addition it also acts as a reaction accelerator after the adhesive has been applied to the surface to be bonded. While the acetone is in the liquid adhesive mixture containing the setting agent, it acts as an inhibitor of the gelling of the reactive mass, but when the adhesive is applied to the worked surfaces the acetone volatilizes rapidly and permits the setting action of the resin to proceed with great speed.

It has, of course, been proposed to use acetone as a solvent for phenolic resins, but here the acetone and its equivalents such as other ketones simply act as solvents. In the present invention the ketone, not only acts as a solvent but, more importantly, inhibits the gelling of the very reactive adhesive mixture prior to spreading. The straight phenolic resins show no tendency to gel in solution during the period in which they are being used, and, therefore, the acetone does not act as an inhibitor of gelling.

Unless the acetone or other equivalent ketone is used when the copolymer resin contains a monohydroxy phenol such as phenol per se, $C_6H_5OH$, as 40% to 80% of its phenolic body, then it is impossible to obtain a satisfactory working life of the adhesive and yet have it cure to a final set within 10 to 48 hours at temperatures varying from 60° to 120° F. In view of the above, when the total phenolic body contains less than 40% of a monohydric phenol, it is not necessary to employ a ketone gel-inhibitor, the latter being employed when the percentage of the polyhydric phenol, as for example the dihydric phenol such as resorcin or its equivalent in the total phenolic body varies from 20% to 60%. Instead of using acetone, any of the lower alkyl ketones, simple or mixed, containing up to 10 carbon atoms in a molecule may be used, as for example, methyl-ethyl ketone, methyl propyl ketone, dibutyl ketone, diisopropyl ketone, diisobutyl ketone, and the like. The amount of lower ketone containing up to 10 carbon atoms in a molecule present in the adhesive base, that is, the copolymer resin dissolved in its solvent medium may vary broadly from 5% to 90% by weight taken on the total solvent medium present in said adhesive base. Preferably the amount of ketone used varies from 5% to 40% taken by weight on the amount of solvent used. Good results have been obtained when the lower alkyl ketone, as for example acetone, is present in the solvent mixture in an amount equal to 20% by weight.

EXAMPLE III

PRODUCTION OF A RESIN, THE PHENOLIC BODY OF WHICH CONTAINS 80% MONOHYDRIC PHENOL AND 20% DIHYDRIC PHENOL TAKEN ON A MOLAR BASIS

An undehydrated reaction product of phenol and formaldehyde is produced by reacting the following ingredients:

| | Grams |
|---|---|
| U. S. P. phenol crystals | 2256 |
| 37% formaldehyde | 1152 |
| Sodium hydroxide | 35 |
| Water | 150 |

The phenol and formaldehyde in the proportions above set forth are first introduced into the reaction kettle and are followed by the addition of the sodium hydroxide dissolved in water. Under agitation the mass is gradually heated to reflux and maintained until the formaldehyde is substantially completely reacted with the phenol to form a primary undehydrated phenol-aldehyde condensation product.

There is then introduced into a separate reaction kettle 660 grams of resorcin. Thereafter, there is added to the resorcin 200 grams of 37% formaldehyde. Heating is gradually applied with agitation until an exothermic reaction occurs. Thereafter the temperature of the resulting reaction mixture is raised to reflux temperature, and 100 grams of 37% formaldehyde is gradually added while maintaining a reflux temperature. There is thereby produced a primary undehydrated resorcin-formaldehyde condensation product. This product is preferably maintained in the kettle at a temperature which adapts it to be pumped, as for example, the temperature varying between 90° C. and 100° C.

The resorcin-formaldehyde condensation product is then gradually added to the phenol-formaldehyde condensation product present in the first reaction kettle, the addition being preferably effected while the phenol-formaldehyde condensation product is maintained at a reflux temperature. The inter-condensation of these two components, and subsequent dehydration is effected in a manner similar to that set forth in Example I.

The product produced is a brittle, permanently fusible copolymer phenol resorcinol-formaldehyde resin having a softening point on the copper bar of 110° C. The resin shows no detectable free phenol and has less than .5% to 1% of moisture.

To 1000 grams of the brittle resin prepared as above set forth there is added 400 grams of water, 400 grams of isopropyl alcohol, 200 grams of acetone, and 50 cc. of 12 normal caustic to produce an adhesive base containing 50% solids. This forms an adhesive base which is now ready to be set by the addition thereto of a setting agent which is in the best form of the invention a formaldehyde-liberating agent.

To the resin adhesive base prepared as above set forth there is added 125 grams of paraformaldehyde, 200 grams of walnut shell flour. The resulting resin adhesive will have a "working life" of three hours at 75° F. and can be used to glue various objects together including wood to wood and metal to metal or any two cellulosic materials together. When used to manufacture a piece of 1/16" birch plywood the adhesive develops a bond strength of 500 p. s. i. and 50% wood failure within six hours at 75° F. to 80° F.

In order to demonstrate the strength of adhesives of the present invention when used for the bonding of wood, a series of adhesive bases was prepared containing copolymer phenol resorcinol formaldehyde resins in which the ratio of phenol to resorcinol was changed respectively. This ratio was varied from a ratio of one part of phenol to 9 parts of resorcinol to a ratio of 9 parts of phenol to 1 part of resorcinol. Each formulation consisted of the following ingredients:

| | Grams |
|---|---|
| Phenol - resorcinol - formaldehyde copolymer resin | 50 |
| Water | 20 |
| Commercial solvent alcohol | 20 |
| Commercial acetone | 10 |

Each adhesive base was modified with 12 N sodium hydroxide solution. To each resin adhesive base so prepared, there was added 7 grams of paraformaldehyde and 13 grams of walnut shell flour. The resulting resin adhesives were than applied to Vermont rock maple to prepare standard block shear specimens. The specimens were allowed to cure by maintaining under clamping pressure for a period of 24 hours at a temperature of 75° F. The samples were then allowed to develop maximum set or bond strength by maintaining at 75° F. for an additional 24 hours. At the end of the period of additional aging the samples were tested for shear strength. The results of said tests are set forth in the table.

*Table*

| Ratio of Phenol: Resorcinol in Copolymer Resin | pH of Adhesive | Shear Strength, lb./in.² | Wood Failure, (Per Cent) | Working Life of Adhesive, hrs.: min. |
|---|---|---|---|---|
| 1:9 | 8.3 | 3,036 | 50 | 0:40 |
| 2:8 | 8.4 | 2,683 | 56 | 0:45 |
| 3:7 | 8.4 | 2,950 | 73 | 0:37 |
| 4:6 | 8.4 | 3,105 | 60 | 0:42 |
| 5:5 | 8.3 | 2,962 | 82 | 1:47 |
| 6:4 | 8.3 | 2,906 | 88 | 2:00 |
| 7:3 | 8.3 | 2,707 | 75 | 3:30 |
| 8:2 | 8.4 | 2,415 | 50 | 4:00 |
| 9:1 | 8.3 | 1,810 | 24 | 4:20 |

The adhesive comprising the copolymer resin containing a phenol to resorcinol ratio of 8:2 is shown in the table to exhibit substantially high shear strength, but the resin containing a phenol to resorcinol ratio of 9:1 when formulated in the same manner showed low shear strength and wood failure.

It can be seen from the data in the table that the optimum proportion of phenol to resorcinol in a phenol resorcinol-formaldehyde copolymer resin is below a molar ratio of 9 of the phenol to 1 of the resorcinol comprising the total phenolic body of the resin adhesive. This is evidenced by the fact that whereas when 80% of the phenolic body is phenol, the adhesive shear strength is 2415 pounds with a wood failure of 50%; when the monohydric phenolic proportion is increased to 90% of the total phenolic body then the shear strength falls to 1810 lbs. with only 24% wood failure. Thus it can be stated that in order to make an effective cold setting adhesive reaching its final set in 10 to 48 hours at a temperature of 60° F. to 120° F., the amount of phenol present in the total phenolic body of the two-stage permanently fusible copolymer monohydric phenol dihydric phenol-aldehyde resin should be less than 90% and preferably not exceed 80% by weight. In other words, the amount of dihydric phenol present in the phenolic body should be, for most satisfactory results, at least 20% by weight.

It is to be understood that where the pH of the resin adhesive is herein referred to it is the apparent pH of the resin adhesive or the resin adhesive base determined by inserting glass electrodes of a standard Beckman electrometric pH meter in the adhesive mixture, and determining the pH by taking the reading of the instrument as the apparent pH.

In the present invention the pH of the copolymer resin in solution is maintained between 7 and 10 in order that the resin may cold set as hereinbefore set forth in detail. At pH's higher than 10, as for example above 10 and between 12, the copolymer resin adhesive will still cold set, but the resulting product will be extremely sensitive to breakdown by water immersion. Therefore, in the preferred form of the present invention the pH of the cold setting copolymer resin adhesive should be 10 or lower. When the pH of the copolymer resin adhesive solution falls substantially below 7 the speed of setting of the resin adhesive is so slow that it will not reach its final set in a period of 10 to 48 hours. While the copolymer resin adhesive is preferably maintained between 7 and 10, in some cases for special purposes the pH of the resin adhesive may be adjusted between 7 and 9.

When the expression "between 7 and 10" is used to denote the pH range, or "between 7 and 9" to denote the pH range, it is to be understood that a pH of 10 or 9 respectively is included.

While resorcin has been set forth as an example of a dihydric phenol, it is to be understood that in the examples given, the resorcin may be substituted by other dihydric phenols including catechol, hydroquinone, orcin, and the like. In the examples given for the dihydroxy phenols of which resorcin is exemplary, there may be substituted a trihydroxy phenol such as phloroglucinol.

Instead of using formaldehyde as the resin-forming aldehyde for the monohydric phenol or the dihydric phenol, other resin-forming prior art aldehydes may be used such as acetaldehyde, propyl aldehyde, butyl aldehyde, furfuraldehyde, and the like. Dialdehydes may also be used such as glyoxal. Instead of using a single aldehyde, a mixture of aldehydes may be used.

While the reaction between the monohydric phenol and the aldehyde is carried out in the examples given in the presence of sodium hydroxide as the catalyst, it is within the province of the present invention to use other alkaline catalysts such as potassium hydroxide, barium hydroxide, calcium hydroxide, ammonium hydroxide; and amines such as triethanol amine, ethylene diamine, and the like. Commercial triethanol amine is an impure product containing a certain proportion of di and mono ethanol amine.

Other alkaline catalysts which may be used are the alkaline salts, as for example sodium, potassium or lithium carbonates, tribasic sodium phosphate and the like, which are usually used as alkaline catalysts in the production of thermosetting resins.

Although no catalyst has been set forth for use in catalyzing the dihydroxy phenol-aldehyde reactions, both acidic and alkaline catalysts may be employed as is well known, it being pointed out that the prior art has established that no catalyst is necessary for the initiation of reaction between resorcin and formaldehyde.

In the examples given the amount of sodium hydroxide functioning as the catalyst is around 2% taken on the weight of the monohydric phenolic body. However, this may vary considerably depending on the alkaline strength of the catalyst employed. In general, it is necessary that sufficient catalyst be employed to form the primary condensation product in which the formaldehyde is substantially completely reacted with the phenolic body. Broadly, the percentage of catalyst may vary between about .2 of 1% to 10%, but preferably 1% to 5%, said percentages all being taken on the weight of the monohydric phenol used to produce the monohydric phenol-aldehyde primary condensation product.

Instead of dissolving the copolymer resin in isopropyl alcohol any of the lower aliphatic alcohols up to and including propyl alcohol may be used. In lieu of the alcohols, the lower alkyl ketones may be used such as acetone, methyl ethyl ketone, diethyl ketone, methylpropyl ketone, methyl isopropyl ketone, and ethyl propyl ketone.

Under some circumstances where long assembly time is desirable, a higher boiling point secondary solvent may be substituted for a portion of the primary solvents previously mentioned, such as the alcohols and ketones. Examples of the secondary solvents which may be used to increase the assembly time of the copolymer resin adhesive are the esters and ethers of polyhydroxy alcohols. Cellosolve which is an ether of ethylene glycol may be used or ethers of diethylene glycols known as Carbitol may be used. Ethyl, diethyl, methyl, and butyl Cellosolves are representative of glycol ethers containing alkyl constitutents, and phenol Cellosolve and benzyl Cellosolve are representatives of the aromatic-containing Cellosolves. Methyl Carbitol, butyl Carbitol and Carbitol, the latter being diethylene glycol monomethyl ether, and diethyl Carbitol are representatives of the Carbitols which may be used to increase the "pot life" or "working life" of the resin adhesive of the present invention and, likewise, increase the open assembly time of the resin adhesive. The glycol ethers all contain the radical —CH$_2$CH$_2$OH. For the same purpose there may be used the esters of polyhydroxy aliphatic alcohols, as for example glyceryl acetate, diethylene glycol monostearate, and the like.

The solvent medium for the resin adhesive may be a primary solvent, as hereinbefore set forth, or may consist of a primary solvent and a secondary solvent. The basic requisite for the solvent medium is that when it is used for the bonding of cellulosic material, the solvent should not induce deterioration of the cellulosic fibers due to the presence of acid components or acid-generating components.

The solvent medium may contain as high as 75% water, the balance being any of the organic solvents herein set forth or mixtures thereof.

The resin adhesives of the present invention may be made without fillers or extenders. Where the contact surfaces are plane, said glues will be equally effective in gluing and developing the required predetermined optimum bonding strength. Although walnut shell flour has been set forth in the examples, other fillers or extenders which are the equivalent thereof may be used. Among these fillers or extenders are protein meals, starch compositions, cocoanut shell flour, powdered lignin, finely powdered metals, inorganic compounds such as barium sulfate, ground slate, iron oxide such as Venetian red, and other organic and inorganic materials which exert no deleterious effect on the bond or the bonded material.

In accordance with the present invention, unfilled resin adhesives compounded as herein set forth are particularly useful in low temperature bonding, that is, at temperatures below 120° F., of strips or sheets of paper, cloth, wood, and the like, to form hollow articles such as tubes, tanks, ducts, and similar articles. The unfilled glue compositions herein set forth may be used in the production of molds for low pressure molding and for the casting of articles wherein are employed the methods usually used for the casting of sand, clay, plaster of Paris, papier-mâché, and the like. For example, macerated cloth or paper may be impregnated with the resin adhesives herein set forth and the impregnated materials shaped and formed, after which they may be cured at room temperature, that is, at temperatures varying from 60° to 90°–110° F., or at elevated temperatures as described.

In the bonding of metal or other relatively nonporous materials, it has been found that excellent gluing may be obtained by applying a relatively thin coat of any of the resin adhesives herein set forth to the surfaces to be joined and allowing the resin adhesive to cure or partially cure prior to actually gluing the surfaces together in the customary manner. After the glue has been cured, or partially cured, either by using a temperature varying from about 60° to about 100° or 120° F., which may be termed "cold gluing," the cured laminae may be given a second coat of glue and be bonded together under pressure. The resin adhesives of the present invention may have a thermoplastic agent admixed therewith. This is highly desirable when the glue joint in use is subjected to flexural action, that is, where the joint is not rigidly fixed in one position. In such cases, elasticity is required. Although the resin adhesive film of the present invention is resilient and tough when cured, for such applications, it has been found that superior bonds may be obtained by blending a thermoplastic agent, or a plurality of thermoplastic agents, with the resin adhesive in any solvent medium, and then curing the dispersed glue in the presence of the thermoplastic agent while the joint is subjected to pressure and heat, if desired.

In the examples herein set forth, various amounts of setting agents, as for example formaldehyde, have been set forth. These amounts are by way of illustration and not by way of limitation. Functionally, all that is necessary is that sufficient setting agent be used to convert the adhesive base to its set-up form. Excess amounts are not known to be harmful. In the commercial application of the present invention, it is customary to set the adhesive resin base containing the permanently fusible resin with 10% to 50% of excess setting agent, including an excess of 37% formaldehyde solution.

It may be pointed out that it is well known that, in curing cellulosic members at temperatures in the vicinity of 240° to 350° F., the moisture loss in such hot pressing operations is of the order of 4% to 6%, resulting in it being necessary to rehumidify the pieces after completion of the curing or pressing operation. Also it is well known in the art that this alternate drying and wetting of the wood and the hot pressing at relatively high temperatures sets up stresses in the wood such that, on aging, warping frequently occurs. Many methods have been proposed for achieving curing temperatures below that of boiling water, wherein the moisture loss is usually less than 1%, and at such temperatures stress strains in the wood are greatly reduced and warping substantially prevented. As has been previously pointed out, prior art resin glues capable of being used as bonding media in this low temperature range have exerted harmful acid weakening effects on the wood. The adhesives of the present invention, however, not only provide a method of bonding at temperatures wherein no stresses are set up but also no deleterious effects because of said hardening agents are produced in the wood. Thus, not only is warping prevented, but higher strength values are present in the bonded assemblies because of the absence of moisture-heat-induced stress strains and because of the lack of wood-weakening acid compounds.

The resin adhesives of the present invention are particularly useful in the bag molding art, where a rubber, cellophane, paper, or other bag is employed as a surface for the transmission of air, steam, or fluid pressure in the production of molded articles. In the bag molding art, utilizing the resin adhesive of the present invention, the bag life is greatly increased, glue line failures due to insufficient pressure are eliminated, and lower operating temperatures result in mechanical economy and longer life of the molding apparatus.

The resin adhesives herein set forth may be used in the manufacture of small wooden parts and their assembly to form furniture, airplanes, boats, houses, trusses, beams, skis, floats, and other articles of commerce. Referring to the production of airplanes, the present resin adhesive may be used in the production of airplane doors, aileron tabs, rudders, rudder tabs, struts or spar plates, inner sections and propeller blanks. For amphibian planes, the hulls thereof and pontoons may be made using the resin adhesive set forth. The resin adhesive of the present invention is also valuable in the bonding of laminae one to the other or to the bonding of a phenolic laminated part, such as an airplane tab or partition and the like to wood, rubber, leather, and other synthetic materials. By a "phenolic laminated part" is meant laminae such as cotton, paper, leather, wood, asbestos, or mixtures thereof, or, in general, mixtures of organic laminae with inorganic laminae, or mixtures of various types of organic laminae all assembled together under heat and pressure using a phenolic type of bonding agent, the so-produced laminated part usually carrying a phenolic coating. In general, any of the materials above set forth may be bonded to any of the other materials by utilizing any of the herein formulated resin adhesives. Such resins may be set and/or cured in the cold, that is, at temperatures ranging from 60° to 120° F. but preferably at temperatures ranging from 60° to 90° F., and further the cure may be effected at a temperature below 212° F. in order to avoid dehydration of any of the members being glued which are subject to dehydration, as, for example, wood.

It is desired to point out that the resin glue or resin adhesive of the present invention first acquires a preliminary set. By "preliminary set" is meant that time during which it is necessary to keep the work pieces in close contact with each other by means of clamps or weights until the glue has set to such a state that artificial means for keeping the pieces in contact may be removed. This time of preliminary setting will vary as herein set forth with the character of the glue, but usually varies from 1 to 10 hours at room temperatures.

The maximum set or cure is defined as that point at which the glue line has reached its maximum strength. It is not necessary to retain the work members in close contact by artificial means after the preliminary set has occurred. The glue continues, after the preliminary setting, to cure, and the maximum strength will usually be developed during a period varying between 10 to 48 hours, depending on the temperature of cure. The higher the temperature of cure, under 212° F., the less time it takes for the maximum tensile and shear strengths, as herein set forth, to be developed.

The resin adhesives of the present invention may be used as a bonding medium at temperatures below 120° F. to bond metal to metal, including non-porous metal to non-porous metal, or porous metal to porous metal, or non-porus metal to porous metal. Metals which may be bonded are steel, iron, steel alloys, such as chromium steel alloys, molybdenum steel alloys, zirconium steel alloys, and magnesium aluminum alloys. An aluminum member may be bonded to an aluminum member, this including the bonding of thin laminae of aluminum.

The resin adhesive of the present invention may be used to bond together units of different material, as for example steel to asbestos, or other mineral material, including laminae of steel to laminae of asbestos; steel to rubber; steel to paper; steel to wood, steel to leather, paper, nylon, and phenolic members or laminae. Rubber may be bonded to a ceramic member and ceramic members may be bonded to ceramic members. The composite member which is bonded by the low temperature resin adhesives of the present invention may comprise a laminated structure made up, for example, of wood, steel, asbestos, rubber and leather.

In accordance with the present invention, there may be provided an article comprising a plurality of fibrous members selected from any of the materials herein set forth, said members being bonded with a set and hardened neutral copolymer resin bond, the fibrous members substantially retaining their original moisture content. In connection therewith, it is desired to point out that previously it has been necessary to control the moisture content of fibrous materials to be bonded within relatively narrow limits, and, more commonly, between 4% and 10%. Occasionally, fibrous materials have contained as high as 15% moisture and as low as 1% or 2% moisture, but in these cases the bond which was achieved usually weakened on aging because of the discrepancy in moisture content between the plies after heating, as has been pointed out in connection with warping. It is also well known that when members maintaining a high moisture content of the order of 10% to 15% or 20% are hot pressed, explosions frequently occur on relieving the pressure, because of the trapped moisture which has been heated sufficiently to form high pressure steam. On the contrary, the present invention requires no such moisture control, in that woods of a saturated moisture content may be glued successfully as no steam-forming heat is required. The hot pressing operation results in unequal moisture distribution. After the high temperature operation is completed, the unequal moisture distribution of the wood results in warping as the panel reaches equilibrium, that is, when the moisture content of all members of the panel become constant by virtue of the migration of the moisture from areas of high moisture content to areas of lower moisture content and to and from the areas, this being a gradual process whereby the various members of the composite unit are conditioned to a substantially even distribution of moisture. As stated, this produces warping. However, in accordance with the present invention, the bonding is effected at low temperatures without any substantial migration of the moisture content of the members being bonded, and therefore no warping results in the final cooled composite member.

The composite unit of fibrous members, bonded with the set and hardened neutral copolymer resins of the present invention is characterized by the members retaining during the bonding step their normal water content of 2% to 12% and rehumidification is not necessary. In accordance with the present invention it is possible to bond a plurality of fibrous members having an initial water content varying from zero to 20% or even higher. The bonds have a shear strength in pounds per square inch approximating that of the fibrous members, the term "fibrous" including cellulosic materials, natural organic fibers such as silk, wool, and leather, and synthetic organic fibers such as nylon; and mineral materials, such as asbestos, glass fibers, mineral wools, and the like.

The term "formaldehyde-liberating agent" as herein used is intended to define a setting agent which liberates reactive formaldehyde under the conditions of use to harden the setting resin by forming a methylene bridge and splitting off chemical $H_2O$ in the process. This definition excludes the use of hexamethylenetetramine because the latter when used as a setting agent splits off ammonia. However, the expression "formaldehyde-liberating agent" does include the use of methylol compounds performing the above mentioned function.

This application is a continuation-in-part of application Serial No. 614,096, filed September 1, 1945, the latter application being a continuation-in-part of application Ser. No. 454,606, filed August 12, 1942, now Patent No. 2,385,373, granted September 25, 1945. The present application is also a continuation-in-part of application Ser. No. 494,850, filed July 15, 1943, now Patent No. 2,414,415, granted January 14, 1947.

What is claimed is:

1. The method comprising making a resin adhesive which cold sets at a temperature varying between 40° F. and 120° F. and attains its final set within a time period of 48 hours by forming a water-containing liquid mixture of a permanently fusible copolymer monohydroxy phenol, dihydroxy phenol-aldehyde resin, wherein the percentage of the dihydric phenol in the total phenolic body is at least 20%, the hydroxy groups of said dihydric phenol being on the same carbon ring, and a formaldehyde-liberating setting agent in an amount sufficient to set and harden the resin while maintaining the pH of the liquid resin adhesive between 7 and 10.

2. The method comprising making a resin adhesive which cold sets at a temperature varying between 40° F. and 120° F. and attains its final set within a time period of 48 hours by forming a water-containing liquid mixture of a permanently fusible copolymer monohydroxy phenol, resorcin-aldehyde resin, wherein the percentage of the resorcin in the total phenolic body is at least 20%, and a formaldehyde-liberating setting agent in an amount sufficient to set and harden the resin while maintaining the pH of the liquid resin adhesive between 7 and 10.

3. The method comprising making a resin adhesive which cold sets at a temperature varying between 40° F. and 120° F. and attains its final set within a time period of 48 hours by forming a water-containing liquid mixture of a permanently fusible alkaline-catalyzed copolymer monohydroxy phenol, resorcin-aldehyde resin, wherein the percentage of the resorcin in the total phenolic body is at least 20%, and a formaldehyde-liberating setting agent in an amount sufficient to set and harden the resin while maintaining the pH of the liquid resin adhesive between 7 and 10, the alkaline-catalyst exerting a pH modifying action on the resin and being otherwise substantially inert toward the resin.

4. A liquid resin adhesive which cold sets at a temperature varying between about 60° F. and about 120° F. comprising a water-containing liquid mixture of a permanently fusible copolymer monohydroxy phenol, dihydroxy phenol-aldehyde resin, the phenolic body of which contains at least 20% of a dihydroxy phenol, the hydroxyl groups of the latter being on the same carbon ring, and a formaldehyde-liberating setting agent in an amount sufficient to set and harden the resin adhesive, the pH of the liquid resin adhesive being maintained between 7 and 10.

5. A liquid resin adhesive which cold sets at a temperature varying between about 60° F. and about 120° F. comprising a water-containing liquid mixture of a permanently fusible copolymer monohydroxy phenol, resorcin-aldehyde resin, the phenolic body of which contains at least 20% of resorcin, and a formaldehyde-liberating setting agent in an amount sufficient to set and harden the resin adhesive, the pH of the liquid resin adhesive being maintained between 7 and 10.

6. A liquid resin adhesive which cold sets at a temperature varying between about 60° and 120° F. comprising a liquid mixture of a permanently fusible alkaline-catalyzed copolymer monohydroxy phenol dihydroxy phenol-aldehyde resin wherein the percentage of the dihydric phenol in the total phenolic body varies from 20% to 60% by weight, the hydroxyl groups of the dihydric phenol being on the same carbon ring, said resin being dissolved in a mixture of water, a lower aliphatic alcohol containing up to and including 3 carbon atoms in the molecule and a lower aliphatic ketone containing up to 8 carbon atoms in a molecule, said ketone being present in an amount equivalent to 5% to 40% by weight of the total solvent medium; and a formaldehyde-liberating setting agent in an amount sufficient to set and harden the resin, the pH of the liquid resin adhesive being between 7 and 10, the alkaline-catalyst exerting a pH modifying action on the resin and being otherwise inert.

7. A liquid resin adhesive which cold sets at a temperature varying between 60° F. and 120° F. comprising a liquid mixture of a permanently fusible alkaline-catalyzed copolymer monohydroxy phenol resorcin-aldehyde resin wherein the percentage of the resorcin in the total phenolic body varies from 20% to 60% by weight, said resin being dissolved in a mixture of water, a lower aliphatic alcohol containing up to and including 3 carbon atoms in its molecule and a lower aliphatic ketone containing up to and including 8 carbon atoms in the molecule, said ketone being present in an amount equivalent to 5% to 40% by weight of the total solvent medium; and a formaldehyde-liberating setting agent in an amount sufficient to set and harden the resin, the pH of the liquid resin adhesive being between 7 and 10, the alkaline-catalyst exerting a pH modifying action on the resin and being otherwise substantially inert towards the resin.

8. A liquid resin adhesive which cold sets at a temperature varying between about 60° F. and 120° F. comprising a liquid mixture of a permanently fusible alkaline-catalyzed copolymer monohydroxy phenol dihydroxy phenol-aldehyde resin wherein the percentage of the dihydric phenol in the total phenolic body varies from 20% to 60% by weight, the hydroxyl groups of the dihydric phenol being on the same carbon ring, said resin being dissolved in a water-containing solvent medium having present 5% to 90% of a lower aliphatic ketone containing up to and including 8 carbon atoms in its molecule, and a formaldehyde-liberating setting agent in an amount sufficient to set and harden the resin, the pH of the liquid resin adhesive being between 7 and 10, the alkaline-catalyst exerting a pH modifying action on the resin and being otherwise substantially inert towards the resin.

9. A liquid resin adhesive which cold sets at a temperature varying between about 60° F. and 120° F. comprising a liquid mixture of a permanently fusible alkaline-catalyzed copolymer monohydroxy phenol resorcin phenol-aldehyde resin wherein the percentage of the resorcin in the total phenolic body varies from 20% to 60% by weight, the hydroxyl groups of the dihydric phenol being on the same carbon ring, said resin being dissolved in a water-containing solvent medium having present 5% to 90% of a lower aliphatic ketone containing up to and including 8 carbon atoms in its molecule, and a formaldehyde-liberating setting agent in an amount sufficient to set and harden the resin, the pH of the liquid resin adhesive being between 7 and 10, the alkaline-catalyst exerting a pH modifying action on the resin and being otherwise substantially inert towards the resin.

10. A liquid resin adhesive which cold sets at a temperature varying between about 60° F. and 120° F. comprising a liquid mixture of a permanently fusible alkaline-catalyzed copolymer monohydroxy phenol, polyhydroxy phenol-aldehyde resin wherein the percentage of the polyhydric phenol in the total phenolic body varies from 20% to 60%, said resin being dissolved in a water-containing organic solvent medium having present 5% to 40% of a lower aliphatic ketone containing up to 10 carbon atoms in its molecule, and a formaldehyde-liberating setting agent in an amount sufficient to set and harden the resin, the pH of the liquid resin adhesive being between 7 and 10.

11. The method comprising making a resin adhesive which cold sets at a temperature varying between 60° F. and 120° F. and obtains its final set within a time period of 48 hours comprising heat-forming in the presence of an alkaline-catalyst exerting a pH modifying action on the resin and being otherwise substantially inert towards the resin, an undehydrated reaction product of a monohydric phenol where at least two of the carbon atoms in the carbon ring in the 2-4-6 positions have hydrogen attached thereto and a resin-forming aldehyde which is more reactive with the phenol than it is with itself, separately heat-forming an undehydrated primary reaction product of a dihydric phenol the hydroxy groups of which are on the same carbon ring, at least two of the carbon atoms in the 2-4-6 positions of the ring having hydrogen attached thereto and a resin-forming aldehyde which is more reactive with the phenol than it is with itself mixing said reaction products, the molar ratio of the aldehyde reactants in the mixture to the total phenolic contents of the mixture being maintained to produce a permanently fusible resin, heating the mixture to effect inter-condensation of the primary monohydric phenol-aldehyde condensation product with the primary dihydric phenol-aldehyde condensation product to produce a substantially homogeneous undehydrated liquid resin, dehydrating and further condensing said liquid resin to produce a copolymer condensation product wherein the molar percentage of the dihydric phenol in the total phenolic body is at least 20%, dissolving the resulting copolymer resin in a water-containing solvent medium, adding to said solution a formaldehyde-liberating setting agent in an amount sufficient to set and harden the resin while maintaining the pH of the liquid solution between 7 and 10.

12. The method comprising making a resin adhesive which cold sets at a temperature varying between 60° F. and 120° F. and obtains its final set within a time period of 48 hours comprising heat-forming in the presence of an alkaline catalyst exerting a pH modifying action on the resin and being otherwise substantially inert towards the resin, an undehydrated reaction product of a monohydric phenol where at least two of the carbon atoms in the carbon ring in the 2-4-6 positions have hydrogen attached thereto and a resin-forming aldehyde which is more reactive with the phenol than it is with itself, separately heat-forming an undehydrated primary reaction product of a dihydric phenol the hydroxy groups of which are on the same carbon ring, at least two of the carbon atoms in the 2-4-6 positions of the ring having hydrogen attached thereto and a resin-forming aldehyde which is more reactive with the phenol than it is with itself, mixing said reaction products, the molar ratio of the aldehyde reactants in the mixture to the total phenolic contents of the mixture being maintained to produce a permanently fusible resin, heating the mixture to effect inter-condensation of the primary monohydric phenol-aldehyde condensation product with the primary dihydric phenol-aldehyde condensation product to produce a substantially homogeneous undehydrated liquid resin, dehydrating and further condensing said liquid resin to produce a copolymer condensation product wherein the molar percentage of the dihydric phenol in the total phenolic body is at least 20%, dissolving the resulting copolymer resin in a water-containing solvent medium, adjusting the apparent pH of the resulting solution to between 7 and 10 by the addition of an alkaline pH adjusting agent, and adding a formaldehyde-liberating setting agent in an amount sufficient to set and harden the resin.

13. The method comprising making a resin adhesive which cold sets at a temperature varying between 40° and 120° F. and attains its final set within a period of time of 48 hours by forming a water-containing liquid mixture of a permanently fusible resin which is the copolymer intercondensation reaction product of a monohydric phenol where at least two of the carbon atoms in the carbon ring in the 2-4-6 positions have hydrogen attached thereto, and an aldehyde; and a polyhydroxy phenol selected from the group consisting of di- and trihydroxy phenols, the hydroxy groups of which are on the same carbon ring and where at least two of the carbon atoms in the 2-4-6 positions of the ring have hydrogen attached thereto, and an aldehyde, said aldehyde being reactive with said phenols and forming a resinous condensation product therewith; the percentage of the polyhydroxy phenol in the total phenolic body being at least 20% taken on a molar basis to thereby insure that the set resin attains optimum shear strength, and a formaldehyde-liberating setting agent in an amount sufficient to set and harden the resin while maintaining the pH of the liquid resin between 7 and 10.

14. The method comprising making a resin adhesive which cold sets at a temperature varying between 40° and 120° F. and attains its final set within a period of time of 48 hours by forming a liquid mixture of a permanently fusible resin which is the copolymer intercondensation reaction product of a monohydric phenol where at least two of the carbon atoms in the carbon ring in the 2-4-6 positions have hydrogen attached thereto, and an aldehyde; and a polyhydroxy phenol selected from the group consisting of dihydroxy and trihydroxy phenols, the hydroxyl groups of which are on the same carbon ring and where at least two of the carbon atoms in the 2-4-6 positions of the ring have hydrogen attached thereto, and an aldehyde, said aldehyde being reactive with said phenols and forming a resinous condensation product therewith; the percentage of the polyhydroxy phenol in the total phenolic body being at least 20% taken on a molar basis to thereby insure that the set resin attains optimum shear strength, said resinous mass being dissolved in a mixture of water, a lower aliphatic alcohol having up to 3 carbon atoms in the molecule and a lower aliphatic ketone having up to 8 carbon atoms in the molecule, the latter being present in an amount equivalent to 5 to 40% by weight of the total solvent medium, and a formaldehyde-liberating setting agent in an amount sufficient to set and harden the resin while maintaining the pH of the liquid resin between 7 and 10.

15. The method comprising making a resin adhesive which cold sets at a temperature varying between 40° and 120° F. and attains its final set within a period of time of 48 hours by forming a water-containing liquid mixture of a permanently fusible alkaline-catalyst resin which is the copolymer intercondensation reaction product of a monohydric phenol where at least two of the carbon atoms in the carbon ring in the 2-4-6 positions have hydrogen attached thereto, and an aldehyde; and a polyhydroxy phenol selected from the group consisting of dihydroxy and trihydroxy phenols, the hydroxyl groups of which are on the same carbon ring and where at least two of the carbon atoms in the 2-4-6 positions of the ring have hydrogen attached thereto, and an aldehyde, said aldehyde being reactive with said phenols and forming a resinous condensation product therewith; the percentage of the polyhydroxy phenol in the total phenolic body varying between 20 and 60% taken on a molar basis to thereby insure that the set resin attains optimum shear strength, said resinous mass being dissolved in a water-containing solvent medium having present 5 to 40% of an aliphatic ketone containing up to 8 carbon atoms in the molecule; the alkaline catalyst exerting a pH modifying action on the resin and being otherwise substantially inert toward the resin, and a formaldehyde-liberating setting agent in an amount sufficient to set and harden the resin while maintaining the pH of the liquid resin between 7 and 10.

16. The method comprising making a resin adhesive which cold sets at a temperature varying between 40° and 120° F. and attains its final set within a period of time of 48 hours by forming a water-containing liquid mixture of a permanently fusible alkaline-catalyst resin which is the copolymer intercondensation reaction product of a monohydric phenol where at least two of the carbon atoms in the carbon ring in the 2-4-6 positions have hydrogen attached thereto, and an aldehyde; and a polyhydroxy phenol selected from the group consisting of dihydroxy and trihydroxy phenols, the hydroxyl groups of which are on the same carbon ring and where at least two of the carbon atoms in the 2-4-6 positions of the ring have hydrogen attached thereto, and an aldehyde, said aldehyde being reactive with said phenols and forming a resinous condensation product therewith; the percentage of the polyhydroxy phenol in the total phenolic body varying between 20 and 60% taken on a molar basis to thereby insure that the set resin attains optimum shear strength, said resinous mass being dissolved in a water-containing solvent having present 5 to 90% of acetone, said alkaline catalyst exerting a pH modifying action on the resin and being otherwise substantially inert toward the resin, and a formaldehyde-liberating setting agent in an amount sufficient to set and harden the resin while maintaining the pH of the liquid resin between 7 and 10.

17. The method comprising making a resin adhesive which sets at a temperature varying between 40° and 120° F. and attains its final set within a period of 48 hours by forming a water-containing liquid mixture of a permanently fusible resin which is the copolymer intercondensation reaction product of a monohydric phenol where at least 2 of the carbon atoms in the carbon ring in the 2-4-6 positions have hydrogen attached thereto and an aldehyde; and phloroglucinol and an aldehyde, said aldehyde being reactive with said phenols and forming a resinous condensation product therewith, the percentage of polyhydroxy phenol in the total phenolic body being at least 20% taken on a molar basis to thereby insure the set resin attains optimum shear strength, and a formaldehyde-liberating setting agent in an amount sufficient to set and harden the resin while maintaining the pH of the liquid resin between 7 and 10.

18. The method comprising making a resin adhesive which cold sets at a temperature varying between 40° and 120° F. and attains its final set within a period of time of 48 hours by forming a water-containing liquid mixture of a permanently fusible resin which is the copolymer intercondensation reaction product of a monohydroxy phenol where at least two of the carbon atoms in the carbon ring in the 2-4-6 positions have hydrogen attached thereto, and an aldehyde; and a polyhydroxy phenol selected from the group consisting of dihydroxy and trihydroxy phenols, the hydroxyl groups of which are on the same carbon ring and where at least two of the carbon atoms in the 2-4-6 positions of the ring have hydrogen attached thereto, and an aldehyde, said aldehyde being selected from the group consisting of formaldehyde, acetaldehyde, paraldehyde, propylaldehyde, butyl aldehyde, furfuraldehyde, and glyoxal; the percentage of the polyhydroxy phenol in the total phenolic body being at least 20% taken on a molar basis to thereby insure that the set resin attains optimum shear strength, and a formaldehyde-liberating setting agent in an amount sufficient to set and harden the resin while maintaining the pH of the liquid resin between 7 and 10.

19. The method comprising making a resin adhesive which cold sets at a temperature varying between 40° and 120° F. and attains its final set within a period of time of 48 hours by forming a water-containing liquid mixture of a permanently fusible resin which is the copolymer intercondensation reaction product of a monohydric phenol where at least two of the carbon atoms in the carbon ring in the 2-4-6 positions, have hydrogen attached thereto, and an aldehyde; and resorcin, and an aldehyde, said aldehyde being reactive with said phenols and forming a resinous condensation product therewith; the percentage of the polyhydroxy phenol in the total phenolic body being at least 20% taken on a molar basis to thereby insure that the set resin attains optimum shear strength, and a formaldehyde-liberating setting agent in an amount sufficient to set and harden the resin while maintaining the pH of the liquid resin between 7 and 10.

20. The method comprising making a resin adhesive which cold sets at a temperature varying between 40° and 120° F. and attains its final set within a period of time of 48 hours by forming a water-containing liquid mixture of a permanently fusible resin which is the copolymer intercondensation reaction product of a monohydric phenol where at least two of the carbon atoms in the carbon ring in the 2-4-6 positions have hydrogen attached thereto, and an aldehyde; and resorcin, and an aldehyde, said aldehyde being selected from the group consisting of formaldehyde, acetaldehyde, paraldehyde, propylaldehyde, butyl aldehyde, furfuraldehyde, and glyoxal; the percentage of the polyhydroxy phenol in the total phenolic body being at least 20% taken on a molar basis to thereby insure that the set resin attains optimum shear strength, and a formaldehyde-liberating setting agent in an amount sufficient to set and harden the resin while maintaining the pH of the liquid resin between 7 and 10.

21. The method of bonding a plurality of members one to the other comprising interposing between said members a water-containing liquid resin adhesive mixture of a permanently fusible resin which is the copolymer intercondensation reaction product of a monohydric phenol where at least 2 of the carbon atoms in the carbon ring in the 2-4-6 positions have hydrogen attached thereto and a resin-forming aldehyde, and a polyhydroxy phenol selected from the group consisting of dihydroxy and trihydroxy phenols, the hydroxyl groups of which are in the same carbon ring where at least 2 of the carbon atoms in the 2-4-6 positions have hydrogen attached thereto, and a resin-forming aldehyde, said aldehyde being more reactive with said phenols than it is with itself to thereby produce a resinous condensation product thereof; the percentage of the polyhydroxy phenol in the total phenolic body being at least 20% taken on a molar basis, and a formaldehyde-liberating agent in an amount sufficient to set and harden the resin while maintaining the pH of the liquid resin between 7 and 9, and setting and hardening the adhesive medium of the resulting assembly at a temperature varying between 40° and 120° F.

PHILIP H. RHODES.

(References on following page)

REFERENCES CITED

The following references are of record in the file of this patent:

UNITED STATES PATENTS

| Number | Name | Date |
|---|---|---|
| 1,849,109 | Novotny | Mar. 15, 1932 |
| 2,385,370 | Norton | Sept. 25, 1945 |
| 2,385,373 | Rhodes | Sept. 25, 1945 |
| 2,385,374 | Rhodes | Sept. 25, 1945 |
| 2,398,388 | Norton | Apr. 16, 1946 |
| 2,414,415 | Rhodes | Jan. 14, 1947 |

FOREIGN PATENTS

| Number | Country | Date |
|---|---|---|
| 559,590 | Great Britain | Feb. 25, 1944 |